United States Patent
Johnson (10) Patent No.: US 10,579,738 B2
(45) Date of Patent: Mar. 3, 2020

(54) SYSTEM AND METHOD FOR GENERATING A MULTI-LINGUAL AND MULTI-INTENT CAPABLE SEMANTIC PARSER BASED ON AUTOMATICALLY GENERATED OPERATORS AND USER-DESIGNATED UTTERANCES RELATING TO THE OPERATORS

(71) Applicant: VOICEBOX TECHNOLOGIES CORPORATION, Bellevue, WA (US)

(72) Inventor: Mark Edward Johnson, Castle Cove (AU)

(73) Assignee: Voicebox Technologies Corporation, Bellevue, WA (US)

( * ) Notice: Subject to any disclaimer, the term of this patent is extended or adjusted under 35 U.S.C. 154(b) by 0 days.

(21) Appl. No.: 15/946,687

(22) Filed: Apr. 5, 2018

(65) Prior Publication Data
US 2018/0300313 A1  Oct. 18, 2018

Related U.S. Application Data

(60) Provisional application No. 62/482,182, filed on Apr. 5, 2017.

(51) Int. Cl.
*G06F 17/27* (2006.01)
(52) U.S. Cl.
CPC ...... *G06F 17/2785* (2013.01); *G06F 17/2705* (2013.01)
(58) Field of Classification Search
CPC . G06F 9/45; G06F 17/24; G06F 17/27; G06F 17/2705; G06F 17/2785; G06F 3/16; G06F 9/54; G06F 17/30; G06F 21/62; G10L 15/16; G10L 15/187; G10L 15/06; H04M 3/00; G06N 5/04; G06Q 30/06
USPC .............. 704/2, 9, 10, 257, 4, 251; 709/206; 707/769
See application file for complete search history.

(56) References Cited

U.S. PATENT DOCUMENTS

| | | | | |
|---|---|---|---|---|
| 7,299,261 | B1 * | 11/2007 | Oliver | G06Q 10/107 709/206 |
| 7,555,426 | B2 * | 6/2009 | Wang | G06F 17/274 704/10 |
| 9,473,637 | B1 * | 10/2016 | Venkatapathy | H04M 3/5175 |

(Continued)

*Primary Examiner* — Gerald Gauthier
(74) *Attorney, Agent, or Firm* — Ohlandt, Greeley, Ruggiero & Perle, L.L.P.

(57) ABSTRACT

The disclosure relates to systems and methods for generating semantic parsers based on automatically generated operators and user-designated utterances relating to the operators for use in natural language processing. The system may automatically generate multiple operators that each express a respective computer-executable instruction that resolves a request. These operators may be expressed in a manner that is machine-readable and not necessarily for consumption by a human user. The system may generate a canonical statement that expresses the request in a first manner that a human user would be able to understand. The system may generate a task, such as crowd-sourced task, for a human user to provide an utterance that conveys the canonical statement in a second manner different than the first manner. By doing so, the system may rapidly build operators and learn how humans would utter requests resolved by instructions encoded in the operators for building semantic parsers.

20 Claims, 3 Drawing Sheets

(56) References Cited

U.S. PATENT DOCUMENTS

| | | | |
|---|---|---|---|
| 9,710,243 B2* | 7/2017 | O'Hara | G06F 8/71 |
| 9,830,315 B1* | 11/2017 | Xiao | G06F 17/2785 |
| 10,403,273 B2* | 9/2019 | Lee | G06F 16/24522 |
| 2002/0042707 A1* | 4/2002 | Zhao | G06F 17/27 704/9 |
| 2005/0043940 A1* | 2/2005 | Elder | G06F 16/24522 704/9 |
| 2005/0050042 A1* | 3/2005 | Elder | G06F 16/24522 |
| 2007/0038436 A1* | 2/2007 | Cristo | G06F 17/273 704/9 |
| 2007/0244865 A1* | 10/2007 | Gordon | G06F 16/252 |
| 2008/0243488 A1* | 10/2008 | Balmelli | G06F 17/271 704/10 |
| 2008/0255845 A1* | 10/2008 | Bennett | G06F 17/27 704/257 |
| 2008/0319947 A1* | 12/2008 | Latzina | G06F 17/2785 |
| 2013/0041647 A1* | 2/2013 | Ramerth | G06F 17/2863 704/2 |
| 2013/0132425 A1* | 5/2013 | Chung | G06F 16/242 707/769 |
| 2013/0317823 A1* | 11/2013 | Mengibar | G06Q 30/0277 704/251 |
| 2016/0336008 A1* | 11/2016 | Menezes | G10L 15/187 |
| 2017/0031896 A1* | 2/2017 | Dymetman | G06F 17/2715 |
| 2017/0032025 A1* | 2/2017 | Kumar | G06F 16/832 |
| 2017/0103070 A1* | 4/2017 | He | G06F 16/24522 |
| 2017/0323636 A1* | 11/2017 | Xiao | G06F 16/332 |
| 2018/0121500 A1* | 5/2018 | Reschke | G06F 17/2785 |
| 2018/0137550 A1* | 5/2018 | Choi | G06F 16/332 |
| 2018/0203833 A1* | 7/2018 | Liang | G06F 17/27 |
| 2018/0285170 A1* | 10/2018 | Gamon | G06F 9/541 |
| 2018/0285595 A1* | 10/2018 | Jessen | G06F 21/6245 |
| 2018/0300313 A1* | 10/2018 | Johnson | G06F 17/2785 |
| 2019/0236469 A1* | 8/2019 | Canim | G06F 17/2705 |
| 2019/0310824 A1* | 10/2019 | Sung | G06F 3/167 |

* cited by examiner

SYSTEM AND METHOD FOR GENERATING A MULTI-LINGUAL AND MULTI-INTENT CAPABLE SEMANTIC PARSER BASED ON AUTOMATICALLY GENERATED OPERATORS AND USER-DESIGNATED UTTERANCES RELATING TO THE OPERATORS

CROSS-REFERENCE TO RELATED APPLICATIONS

This application claims the benefit of U.S. Provisional Patent Application Ser. No. 62/482,182, filed Apr. 5, 2017, the entirety of which is hereby incorporated herein by reference.

FIELD OF THE INVENTION

The invention relates to a system and method for generating a semantic parser based on automatically generated operators and user-designated utterances relating to the operators for use in natural language processing.

DETAILED DESCRIPTION OF THE INVENTION

The invention relates to a system and method for generating a semantic parser based on automatically generated operators and user-designated utterances relating to the operators for use in natural language processing. Obtaining large amounts of high-quality training data is required for building natural language understanding systems that use machine learning, including deep learning. Some conventional systems attempt to rapidly obtain such data to generate semantic grammars. For example, a system proposed by Percy Liang et al. ("Building a Semantic Parser Overnight," Proceedings of the 53rd Annual Meeting of the Association for Computational Linguistics and the 7th International Joint Conference on Natural Language Processing, pages 1332-1342, Beijing, China, Jul. 26-31, 2015) ("Liang"), the contents of which is hereby incorporated by reference herein in its entirety, purports to be able to rapidly generate a semantic parser. However, Liang's system uses a complex data structure that may be unable to account for various use cases such as multi-intent requests and does not account for multi-lingual processing. Furthermore, Liang's system fails to validate user responses, making the resulting training set vulnerable to untrustworthy or corrupt data.

Figure 1:
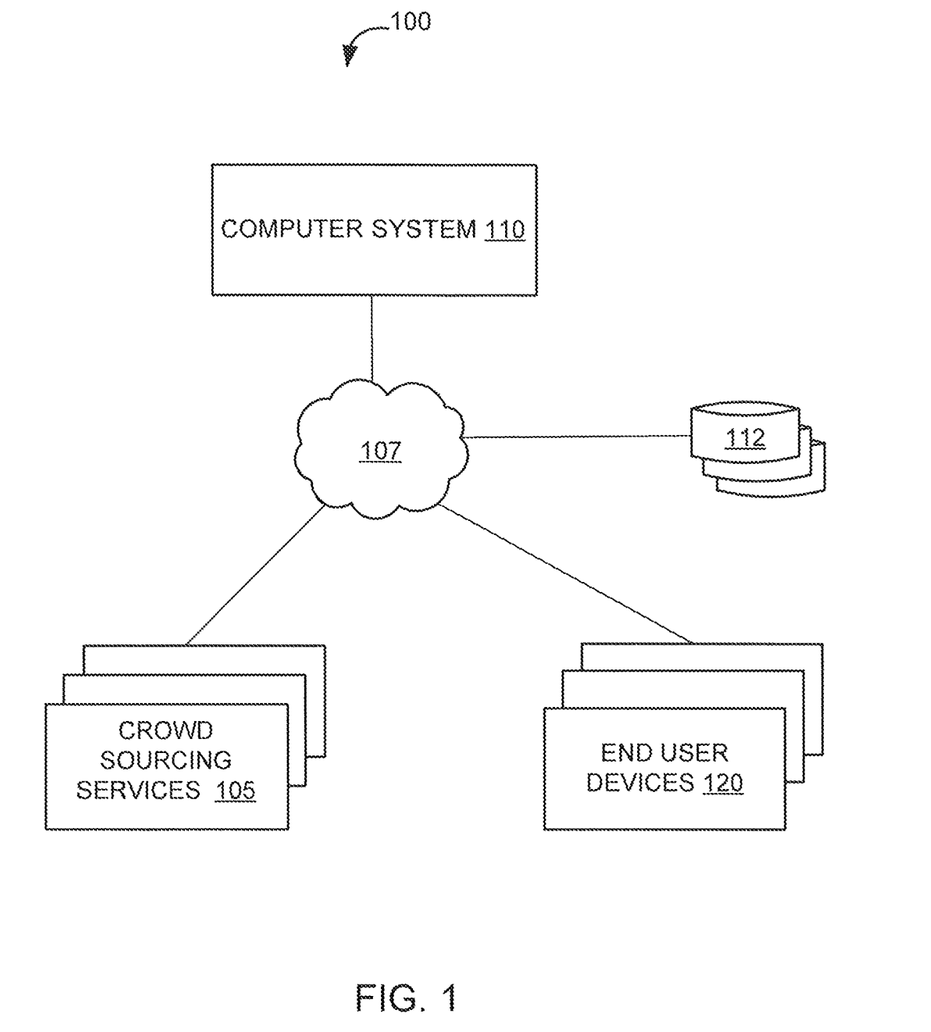
FIG. 1 illustrates a system for generating a semantic parser based on automatically generated operators and user-designated utterances relating to the operators for use in natural language processing, according to an implementation of the invention.

FIG. 1 illustrates a system for generating a semantic parser based on automatically generated operators and user-designated utterances relating to the operators for use in natural language processing, according to an implementation of the invention.

Exemplary System Architecture

In an implementation, system 100 may include a crowd sourcing service 105, a computer system 110, a database 112, one or more end user devices 120, and/or other components. Each component of system 100 may be communicably coupled to one another by one or more computer networks 107.

The system may use crowd sourcing services 105 to deploy crowd jobs to users. Such services may include, for example, Amazon Mechanical Turk™, Crowdflower™, and/or other service that facilitates human intelligence tasks from users who participate in completing predefined tasks, typically, though not necessarily, in exchange for compensation. Crowd jobs may be distributed to users via alternative or additional channels (e.g. directly from computer system 110, online marketing, etc.) as well. Crowd sourcing services 105 may include a computing device programmed by a crowd management application. Alternatively or additionally, computer system 110 may be programmed by the crowd management application.

Database 112 may be configured to store information relating to the features and functions described herein. For example, and without limitation, database 112 may be configured to store various information described herein, such as rules, operators, canonical statements, crowd jobs and their associated responses (e.g., crowd responses that indicate their spoken versions of the canonical statements), and/or other information. End user device 120 may be used by crowd users to respond to tasks. Although not illustrated in FIG. 1, end user devices 120 may each include a processor, a storage device, and/or other components. End user device 120 may be programmed to interface with crowd sourcing services 105 and/or computer system 110. In some instances, end user device 120 may be programmed to provide identifying information to crowd sourcing services 105 and/or computer system 110, as will be described below with respect to computer system 110.

Computer System 110

Figure 2:
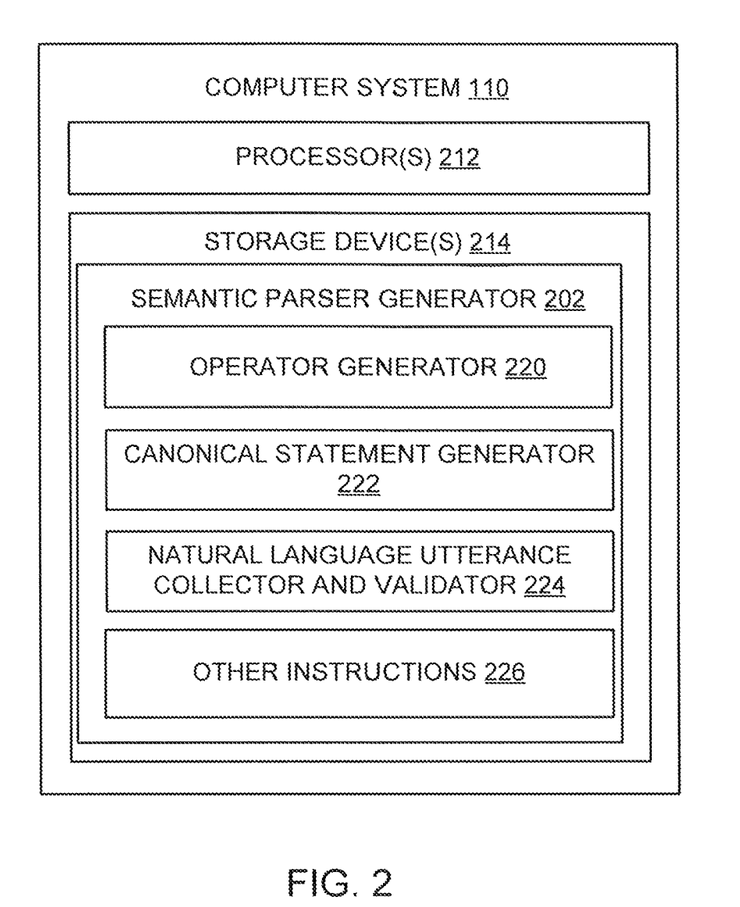
FIG. 2 illustrates a computer system for generating a semantic parser based on automatically generated operators and user-designated utterances relating to the operators for use in natural language processing, according to an implementation of the invention.

FIG. 2 illustrates a computer system 110 for generating a semantic parser based on automatically generated operators and user-designated utterances relating to the operators for use in natural language processing, according to an implementation of the invention. Computer system 110 may be configured as a server, a desktop computer, a laptop computer, and/or other device that can be programmed to collect and validate data for and generate a semantic parser for natural language processing, as described herein.

Computer system 110 may include one or more processors 212 (also interchangeably referred to herein as processors 212, processor(s) 212, or processor 212 for convenience), one or more storage devices 214 (which may store various instructions described herein), and/or other components. Processors 212 may be programmed by one or more computer program instructions. For example, processors 212 may be programmed by semantic parser generator 202.

As illustrated, semantic parser generator 202 may include an operator generator 220, a canonical statement generator 222, a natural language utterance collector and validator 224, and/or other instructions 226 that program computer system 110 to perform various operations. As used herein, for convenience, the various instructions will be described as performing an operation, when, in fact, the various instructions program the processors 212 (and therefore computer system 110) to perform the operation.

Figure 3:
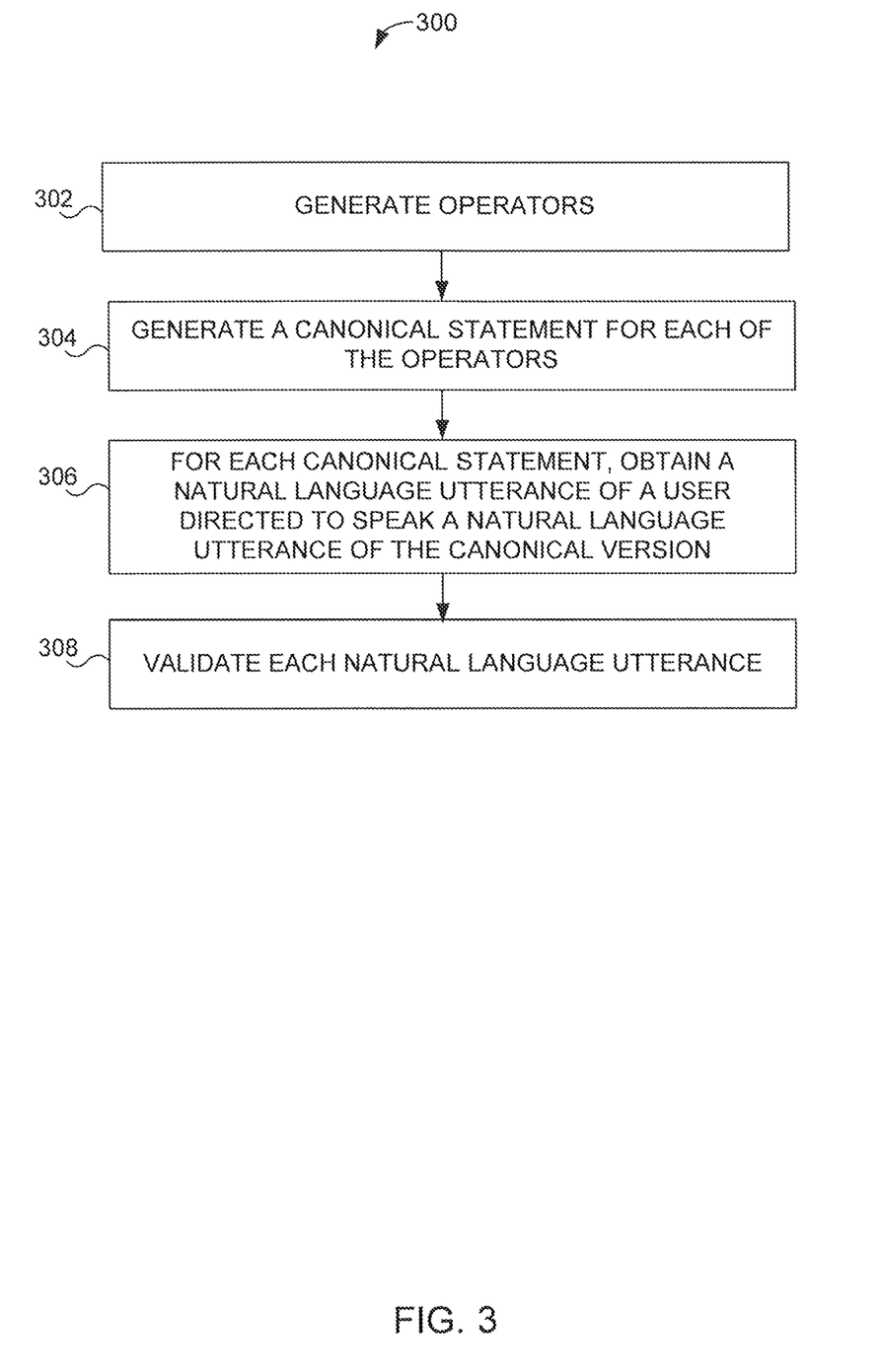
FIG. 3 illustrates a flow diagram of a process for generating a semantic parser based on automatically generated operators and user-designated utterances relating to the operators for use in natural language processing, according to an implementation of the invention.

Reference will be made to FIG. 3, which illustrates a flow diagram of a process for generating a semantic parser based on automatically generated operators and user-designated utterances relating to the operators for use in natural language processing, and examples of system components illustrated in FIG. 2 that may be programmed to perform the process.

Automatically Generating Operators

In an operation 302, operator generator 220 may automatically generate a plurality of operators. Each operator represents a computer-executable instruction that is based on a natural language utterance. For instance, an operator may be a computer-executable instruction that is used to execute a user request "show messages containing pictures." The operator in the foregoing example may be encoded to include (as a non-limiting example) "[type:message, contains:[type:picture]]." Various operators may be automatically generated for various requests and scenarios.

In an implementation, the automatically generated operators may be normalized and de-lexicalized. The normalized and de-lexicalized operators may use an attribute-value structure, which (unlike conventional systems) simplifies and facilitates an ability to abstract and cover complex use cases (such as multi-intent, updates, etc.), which will be discussed in more detail below.

Delexicalized operators are operators where entities are replaced with named entity types. They are computed given a Named Entity Recognition (NER" tagged utterance and its operator. For the utterance, "delete the picture from the space needle", the operator may be generated to be: request(seq([find:[creationLocation:'spaceneedle',type: photo,var:A], delete:[type:photo,var:A]])).

The delexicalized operator: request(seq([find:[creationLocation:<PHOTO_TAG>, type:photo,var:A],delete:[type: photo,var:A] ]))

Normalising Delexicalized Attribute-Value Operators

Because the probabilistic model that generates operators may be defined over attribute-value structures, the delexicalized operators may use an attribute-value format. To do so, the operator generator 220 may move redundant find operations into the following operation, and delete useless seq operators. This yields an operator such as:
request(delete:[type:photo, creationLocation:<PHOTO_TAG>]])

The operator generator 220 may then represent remaining operators in attribute-value format:
[speechact:request, operation:delete, theme:[type:photo, creationLocation: <PHOTO_TAG>]]

This brings all the operators into an attribute-value representation, where every (non-atomic) attribute-value structure has exactly one "head attribute". A head attribute is an attribute such as "operation" or "type" that always appears with an atomic value. The head attribute and its value (in this example, operation:delete and type:photo) specify the other possible attribute-value pairs in the attribute-value structure.

Stochastic Model Over Normalized Delexicalized Operators

In an implementation, for each attribute-value structure, operator generator 220 may identify the head attribute-value pair (e.g., operation:delete or type:photo), count the other attribute-value pairs that co-occur with that head pair, characterizing an attribute-value structure by its head attribute-value pair (e.g., for the operation:delete head pair operator generator 220 record speech-act:request and theme:type: photo). In this way operator generator 220 may obtain counts from the training data of all attribute-value pairs that co-occur with each head attribute-value pair. Operator generator 220 may also record the number of times that a possible attribute does not occur with a head attribute-value pair; which may be required to calculate the probability of an attribute occurring at all with a head attribute-value pair.

Generating Delexicalized Attribute-Value Operators

In an implementation, operator generator 220 may generate a generative model for attribute-value structured operators. Specifically, an attribute-value structure may be generated conditional on its head attribute-value pair as follows.

Operator generator 220 may sample a set of non-head attributes for the head pair, from the set of all non-head attributes observed in the training data for this head pair. (e.g., for type:photo operator generator 220 may sample creationLocation and creationDate; for operation:delete operator generator 220 may sample speech-act and theme).

For each non-head attribute a and each head pair p, operator generator 220 may sample a value v for attribute a, conditional on p and a. If v is itself a head pair then operator generator 220 may recursively sample the non-head attribute-value pairs (e.g., for creationLocation for operator generator 220 may sample <PHOTO_TAG>; for theme operator generator 220 may sample type:photo).

For example, the generative process for the operator:
[speech-act:request, operation:delete, theme:[type:photo, creationLocation:<PHOTO_TAG>]]
may be:
P(operation:delete|ROOT)   P(speech-act|operation:delete) P(request|operation:delete, speech-act) P(theme|operation:delete)
P(type:photo|operation:delete, theme) P(creationLocation|type:photo) P(<PHOTO_TAG>|type:photo, creationLocation)

Table 1A includes non-limiting examples of normalized delexicalized operators described herein.

| original operator | converted |
| --- | --- |
| request(seq([find:[creationLocation:<LOCATION>,label: <FOLDER_TAG>,type:photo,var:A],show: [type:photo,var:A]])) | [speech-act:request,operation:show,theme:[creationLocation: <LOCATION>,label:<FOLDER_TAG>,type:photo]] |
| request(seq([find:[creationLocation:<LOCATION>,label: <PHOTO_TAG>,type:photo,var:A],show: [type:photo,var:A]])) | [speech-act:request,operation:show,theme:[creationLocation: <LOCATION>,label:<PHOTO_TAG>,type:photo]] |
| request(seq([find:[creationLocation: <LOCATION>,type:photo,var:A],delete:[type:photo,var:A]])) | [speech-act:request,operation:delete,theme:[creationLocation: <LOCATION>,type:photo]] |
| request(seq([find:[downloaded:true,label: <PHOTO_TAG>,type:photo,var:A],show: [type:photo,var:A]])) | [speech-act:request,operation:show,theme:[downloaded:true,label: <PHOTO_TAG>,type:photo]] |
| request(seq([find:[label: <FOLDER_TAG>,type:album,var:A],delete: [type:album,var:A]])) | [speech-act:request,operation:delete,theme:[label: <FOLDER_TAG>,type:album]] |

-continued

| original operator | converted |
|---|---|
| request(seq([find:[label:<FOLDER_TAG>,type:photo,var:A],show:[type:photo,var:A]])) | [speech-act:request,operation:show,theme:[label:<FOLDER_TAG>,type:photo]] |
| request(seq([find:[label:<PHOTO_TAG>,label:<PHOTO_TAG>,type:photo,var:A],show:[type:photo,var:A]])) | [speech-act:request,operation:show,theme:[label:<PHOTO_TAG>,label:<PHOTO_TAG>,type:photo]] |
| request(seq([find:[label:<PHOTO_TAG>,selected:false,type:photo,var:A],show:[type:photo,var:A]])) | [speech-act:request,operation:show,theme:[label:<PHOTO_TAG>,selected:false,type:photo]] |
| request(seq([find:[label:<PHOTO_TAG>,type:album,var:A],delete:[type:album,var:A]])) | [speech-act:request,operation:delete,theme:[label:<PHOTO_TAG>,type:album]] |
| request(seq([find:[label:<PHOTO_TAG>,type:photo,var:A],show:[type:photo,var:A]])) | [speech-act:request,operation:show,theme:[label:<PHOTO_TAG>,type:photo]] |
| request(seq([find:[selected:true,type:album,var:A],delete:[type:album,var:A]])) | [speech-act:request,operation:delete,theme:[selected:true,type:album]] |
| request(seq([find:[selected:true,type:photo,var:A],delete:[type:photo,var:A]])) | [speech-act:request,operation:delete,theme:[selected:true,type:photo]] |
| request(seq([find:[selected:true,type:photo,var:A],edit:[editingMethod:'auto adjust',type:photo,var:A]])) | [speech-act:request,operation:edit,editingMethod:'auto adjust',theme: [selected:true,type:photo]] |
| request(seq([find:[selected:true,type:photo,var:A],edit:[editingMethod:crop,type:photo,var:A]])) | [speech-act:request,operation:edit,editingMethod:crop,theme:[selected:true,type:photo]] |
| request(seq([find:[selected:true,type:photo,var:A],edit:[editingMethod:flip,orientation:landscape,type:photo,var:A]])) | [speech-act:request,operation:edit,editingMethod:flip,orientation:landscape,theme:[selected:true,type:photo]] |
| request(seq([find:[selected:true,type:photo,var:A],edit:[editingMethod:rotate,measurement:'180 degrees',type:photo,var:A]])) | [speech-act:request,operation:edit,editingMethod:rotate,measurement:'180 degrees',theme:[selected:true,type:photo]] |
| request(seq([find:[selected:true,type:photo,var:A],edit:[type:photo,var:A]])) | [speech-act:request,operation:edit,theme:[selected:true,type:photo]] |
| request(seq([find:[selected:true,type:photo,var:A],help:[editingMethod:filter,type:photo,var:A]])) | [speech-act:request,operation:help,editingMethod:filter,theme:[selected:true,type:photo]] |
| request(seq([find:[selected:true,type:photo,var:A],hide:[type:photo,var:A]])) | [speech-act:request,operation:hide,theme:[selected:true,type:photo]] |
| request(seq([find:[selected:true,type:photo,var:A],save:[savedAs:wallpaper,type:photo,var:A]])) | [speech-act:request,operation:save,savedAs:wallpaper,theme:[selected:true,type:photo]] |
| request(seq([find:[selected:true,var:A],delete:[storageLocation:<PHOTO_STORAGE_LOCATION>,var:A]])) | [speech-act:request,operation:delete,theme:[selected:true,storageLocation:<PHOTO_STORAGE_LOCATION>],type:photo] |

Generating Lexicalized Attribute-Value Operators

In an implementation, operator generator 220 may collect named entity expressions from NER tagged input. Operator generator 220 may generate lexicalized attribute-value operators by replacing the NER tags in the delexicalized Operators with sampled named entity expressions.

For example, this might generate the operator:

[speech-act:request, operation:delete, theme:[type:photo, creationLocation:"Space needle"]]

Table 1B includes non-limiting examples of utterances, operators, and delexicalized operators described herein.

| utterance | operator | delexicalized operator |
|---|---|---|
| find downloaded tom cruise pics | request(seq([find:[downloaded:true,label:'tom cruise',type:photo,var:A],show:[type:photo,var:A]])) | request(seq([find:[downloaded:true,label:<PHOTO_TAG>,type:photo,var:A],show:[type:photo,var:A]])) |
| delete graduation trip folder | request(seq([find:[label:'graduation trip',type:album,var:A],delete:[type:album,var:A]])) | request(seq([find:[label:<FOLDER_TAG>,type:album,var:A],delete:[type:album,var:A]])) |
| show me other night scene photos | request(seq([find:[label:'night scene',selected:false,type:photo,var:A],show:[type:photo,var:A]])) | request(seq([find:[label:<PHOTO_TAG>,selected:false,type:photo,var:A],show:[type:photo,var:A]])) |
| find photos of the sky | request(seq([find:[label:sky,type:photo,var:A],show:[type:photo,var:A]])) | request(seq([find:[label:<PHOTO_TAG>,type:photo,var:A],show:[type:photo,var:A]])) |
| change image to landscape format | request(seq([find:[selected:true,type:photo,var:A],edit:[editingMethod:flip,orientation:landscape,type:photo,var:A]])) | request(seq([find:[selected:true,type:photo,var:A],edit:[editingMethod:flip,orientation:landscape,type:photo,var:A]])) |

Table 1C includes non-limiting examples of utterances, delexicalized operators, and normalized delexicalized operators described herein.

| utterance | delexicalized operator | normalized delexicalized operator |
|---|---|---|
| find downloaded tom cruise pics | request(seq([find:[downloaded:true,label:<PHOTO_TAG>,type:photo,var:A],show:[type:photo,var:A]])) | [speech-act:request, operation:show, theme:[downloaded:true,label:<PHOTO_TAG>,type:photo]] |
| delete graduation trip folder | request(seq([find:[label:<FOLDER_TAG>,type:album,var:A],delete: | [speech-act:request, operation:delete, theme:[label: |
| show me other night scene photos | request(seq([find:[label:<PHOTO_TAG>,selected:false,type:photo,var:A],show:[type:photo,var:A]])) | [speech-act:request, operation:show, theme: [label:<PHOTO_TAG>,selected:false,type:photo]] |
| find photos of the sky | request(seq([find:[label:<PHOTO_TAG>,type:photo,var:A],show:[type:photo,var:A]])) | [speech-act:request, operation:show, theme:[label:<PHOTO_TAG>,type:photo]] |
| change image to landscape format | request(seq([find:[selected:true,type:photo,var:A],edit:[editingMethod:flip,orientation:landscape,type:photo,var:A]])) | [speech-act:request, operation:edit, theme:[editingMethod:flip,orientation:landscape,selected:true,type:photo]] |

Operators for Complex Use Cases

Negation

Utterances such as "Show messages not containing pictures" or "Delete pictures not containing my family" are negation constructions. In an implementation, negation may be symbolized using an "!" operator on the relevant attribute.

For example, for an operator for "messages containing pictures" is:
[type:message, contains:[type:picture]]
then the operator for "messages not containing pictures" is:
[type:message, !contains:[type:pictures]].

The stochastic model of operators may treat negated attributes (such as !contains) as distinct attributes. For example, in some implementations, the model may not model the relationship between attributes (such as contains) and their negated variants (!contains).

Superlatives and Number Expressions

Superlatives are words such as newest, largest, biggest, etc. A number expression is something such as "the five pictures", or even "the pictures" (where the plural indicates "more than 1"). Number expressions often co-occur with superlatives, e.g., "the five oldest messages". The operators may represent these constructions with the specifier attribute.

The head attribute of a specifier attribute is the term "operator"; its value is the quantifier involved. Superlatives usually involve operator:max or operator:min. Superlatives also use a scale attribute to indicate the scale over which quantification takes place.

For example, "the oldest photo" may have an operator:
[type:photo, specifier:[operator:min, scale:creationDate, count:1] ]
which says "the photo with the minimum creation date".

Count expressions may be expressed by the specifier: count attribute sequence. For example, "five photos" may have the operator:
[type:photo, specifier:[operator:none, count:5]]

The operator:none may provide the required head attribute-value for the embedded attribute-value structure. The count attribute expresses the singular/plural distinction:
The photo=>[type:photo, specifier:[operator:the, count:1]]
The photos=>[type:photo, specifier:[operator:the, count:>1]]

In the above example, ">1" is an atomic value, which denotes the set of numbers greater than 1. In some instances, the count attribute can be combined with operators to express count superlatives, e.g., "the 5 oldest photos" has the operator:
[type:photo, specifier:[operator:min, scale:creationDate, count:5]]

In in some instances, operator generator 220 may combine the specifier with negation, so "all but the 5 oldest photos" could be represented by the operator:
[type:photo, !specifier[operator:min, scale:creationDate, count:5]]

Determiners

Determiners may be a type of specifier and may be expressed using the specifier attribute.

The photo=>[type:photo, specifier:[operator:the, count:1]] The photos=>[type:photo, specifier[operator:the, count:>1]]

A photo=>[type:photo, specifier:[operator:a, count:1]] Photos=>[type:photo, specifier:[operator:a, count:>1]]

This photo=>[type:photo, specifier:[operator:this, count:1]] These photos=>[type:photo, specifier:[operator:this, count:>1]]

Coordination

Coordination constructions may include NP coordination (such as "Sam and Sasha") and sentence coordination (such as "Sam arrived and Sasha left"). Coordination is a difficult problem at least because unlike most linguistic constructions, coordination doesn't have a head-dependent structure; e.g., in Sam and Sasha left, both the phrases Sam and Sasha are dependents of left; and neither is dependent on the other. Since the generative model for LFs assumes this head-dependent structure, we'll need a new mechanism to handle coordination.

The interpretation of an NP coordination sometimes distributes over the head, but not always. For example, Sam and Sasha left means the same thing as Sam left and Sasha left, but Sam and Sasha lifted the piano does not mean the same thing as Sam lifted the piano and Sasha lifted the piano.

While coordination is usually symmetric (i.e., A and B means the same as B and A), sometimes coordination can be asymmetric. For example, coordination used to express sequential actions, e.g., Take a photo and (then) send it to Sasha. (However, some of these asymmetric coordination examples may be encoded in an operator that does not have any explicit coordination, as discussed immediately below).

Some sequential actions may be expressed by embedded attribute-value structures without any explicit coordination:

Take a photo and send it to Sasha=>[speech-act:request, operation:send, recipient:Sasha, theme:[operation:capture, theme:[type:photo, specifier:[operator:a, count:1]]]]

This says "send the result of capturing a photo to Sasha" (as previously noted, the operators would be delexicalized, so "Sasha" would be replaced with <RECIPIENT> in both the utterance and the operator). Sequences of actions where the result of one action is the input to the next action can be represented via embedding, just as in this example.

In an implementation, coordination may be represented in an attribute-value format as follows.
a photo and a message=>[coordinator:and, arg1:[type:photo, specifier:[operator:a, count:1], arg2:[type:message, specifier:[operator:a, count:1]]]

This would be used in an utterance as follows:
Send a photo and a message to Sasha=>[speech-act:request, operation:send, recipient:Sasha, theme: [coordinator:and, arg1:[type:photo], arg2:[type:message]]

In the generative procedure, conditioned on a head attribute-value pair p (e.g., in the example above, operation:send) it first sampled a set of non-head attributes (e.g., the attributes speech-act, recipient and theme), and then given a non-head attribute a and head attribute-value pair p (e.g., a=theme, and p=operation:send) it samples a value v for a.

The value v for an attribute a is generated as follows:

Operator generator 220 may sample whether the value v is a coordinate construction or not. This is sampled from a Bernoulli distribution, where the probability of a coordination is conditioned on a and p. If v is not a coordinate construction, then it is generated conditional on p and a as before.

If v is a coordinate construction then operator generator 220 may sample the number of arguments to the coordinator from a multinomial distribution over the number of arguments (again, conditioned on a and p). Then operator generator 220 may generate each value for the coordination's arguments, using the same method for generating values as for non-coordinate constructions.

That is, in implementations in which operator generator 220 generates a coordination, it may repeat the value generation process for each of the coordination arguments.

In some implementations, operator generator 220 may perform a rejection sampling operation to reject coordination structures with identical arguments (e.g., it would be unusual to say "Send a picture and a picture to Sam").

Multiple-Intent

Some requests have a single intent, such as "what are the closing times of Japanese restaurants in Bellevue?"

In an implementation, closing_time may be represented as an attribute rather than as a function, and the operator used to process the utterance may be
[amenity:restaurant, cuisine:Japanese, location:[name:Bellevue], closing_time:AnsA]

AnsA is an answer variable that indicates that the answer should include "closing_time" information.

Some requests have multiple intents, such as "What are the locations and closing times of Japanese restaurants in Bellevue?" In the foregoing example, there may be multiple answer variables. For example, an operator may leverage the attribute-value format to specify multiple answers:
[amenity:restaurant, cuisine:Japanese, location:[name:Bellevue], location:AnsA, closing_time:AnsB]

Where AnsA and AnsB each are answer variables that indicates that each answer should include "closing_time" information for respective results.

Follow-on Requests

Follow-on requests may refer to a special variable "LastLF", which denotes the set of entities referred to by the previous utterance.

For example, an utterance may be "what Japanese restaurants are in Seattle" and a follow-up utterance may include "What are their closing times?" An operator for the follow-on request may include:
[update:LastLF, closing_time:AnsA]

Where LastLF may be used to recall a previous answer provided in response to a previous utterance.

Updates/Multi-Turn.

The update attribute may trigger a default unification, so incompatible attribute-value pairs from LastLF are dropped.

For example, an utterance may be "what Japanese restaurants are in Seattle" and a follow-up utterance may include "What about Korean?" An operator for the update may include:
[update:LastLF, cuisine:Korean]

The foregoing replaces "cuisine:Japanese" in the operator for "What are the closing times of Japanese restaurants in Bellevue?" given earlier.

In an implementation, instead of a unique variable name for each answer (e.g., AnsA and AnsB), operator generator 220 may use a single variable that is re-used because the resulting value occurs uniquely, so its name is unimportant. That is, operator generator 220 may replace each unique variable name with a single Ans variable, and use a post-processing operation to rename them into separate variables. In the foregoing implementation, the operator may include:
[amenity:restaurant, cuisine:Japanese, location:[name:Bellevue], location:Ans, closing_time:Ans]

Other examples of updates/multi-turn dialogs may be includes, such as, without limitation:

Adding a constraint: "Where are the Starbucks in Kirkland?" "Are any near the waterfront?"

Adding a negative constraint: "Where are the Asian restaurants in Kirkland?" "Not Korean".

Changing a constraint: "Are there any Japanese restaurants in Kirkland?" "What about Korean?"

Follow ups: "What is the name and address of the closest Japanese restaurant?" "Send them to Bob."

Generating Canonical Statements

In an operation 304, canonical statement generator 222 may generate a canonical statement for each relating to the operators generated at operation 302. A canonical statement may be a rephrased version of an operator so that a human user can understand the operator. This is because an operator is intended to be computer-executable and having a structure that can handle various types of requests as described herein but not necessarily be human-comprehensible. As such, for the various operators automatically generated in operation 302 (e.g., by operator generator 220), canonical statement generator 222 may generate a canonical statement. The canonical statement is typically not what a human user would actually utter. Instead, it is a human readable version of the operator so that the system can discover what a human would say to match the operator. This is in contrast to conventional grammar generation systems that first collect user utterances, then tag or characterize the user utterances into commands for training natural language parsers. Instead, system 100 may first generate computer executable instructions and then ask users to make utterances to match those instructions. To do so, system 100 may generate canonical versions of the instructions so that the users can understand the intent of the instructions in order to make utterances that correspond to them.

For example, canonical statement generator 222 may convert attribute-value pairs from an operator using a rule-based process. Each attribute-value pair may be mapped to a string.

Table 2A illustrates a first non-limiting mapping for converting attribute-value pairs from an operator. In this implementation, the strings are intended to be conversational in natur, and attribute-value pairs define whether they occur before or after a head pair.

| Attribute | Value | Text | Position |
|---|---|---|---|
| Speech-act | Request | | |
| Operation | Delete | Delete | |
| Selected | True | This | Premod |
| editingMethod | <x> | <x> | |
| Downloaded | True | Downloaded | premod |
| storageLocation | <x> | From <x> | endmod |

Table 2B illustrates a first non-limiting output for converting attribute-value pairs from an operator, using the technique illustrated at Table 2A.

| generated normalized delexicalized LF | clunky English (delexicalized) | clunky English (lexicalized) |
|---|---|---|
| [operation:show, speech-act:request, theme:[type:photo, label:<PHOTO_TAG>, selected:false, storageLocation:<PHOTO_STORAGE_LOCATION>]] | show other photo with label <PHOTO_TAG> from <PHOTO_STORAGE_LOCATION> | show other photo with label jaipur trip from my picture gallery |
| [operation:save, savedAs:<SAVE_LOCATION>, speech-act:request, theme: [type:photo, downloaded:true]] | save downloaded photo as <SAVE_LOCATION> | save downloaded photo as wallpaper |
| [operation:edit, editingMethod:<EDIT_METHOD>, speech-act:request, theme: [type:photo, label:<PHOTO_TAG>, downloaded:true]] | <EDIT_METHOD> downloaded photo with label <PHOTO_TAG> | rotate downloaded photo with label flowers |
| [operation:hide, speech-act:request, theme: [type:photo, selected:false]] | hide other photo | hide other photos |
| [operation:delete, speech-act:request, theme:[type:photo, label:<PHOTO_TAG>, creationLocation:<LOCATION>]] | delete photo with label <PHOTO_TAG> where creation location is <LOCATION> | delete photos with label night scene where creation location is space needle |

Table 3A illustrates a second non-limiting mapping for converting attribute-value pairs from an operator. In this implementation, the strings are more like database queries, and occur after the head (except for speech-act which is force to occur first.

| attribute | value | text |
|---|---|---|
| speech-act | <x> | <x> |
| operation | <x> | <x> operation |
| selected | <x> | where selected is <x> |
| editingMethod | <x> | where editing method is <x> |
| downloaded | <x> | where downloaded is <x> |
| storageLocation | <x> | where storage location is <x> |

Table 3B illustrates a second non-limiting output for converting attribute-value pairs from an operator, using the technique illustrated at Table 3A.

| generated normalized delexicalized LF | clunky English (delexicalized) | clunky English (lexicalized) |
|---|---|---|
| [operation:show, speech-act:request, theme:[type:photo, | request show operation on photo where label is | request show operation on photo |

-continued

| generated normalized delexicalized LF | clunky English (delexicalized) | clunky English (lexicalized) |
|---|---|---|
| label:<PHOTO_TAG>, selected:false, storageLocation: <PHOTO_STORAGE_LOCATION>]] | <PHOTO_TAG> and where selected is true and where storage location is <PHOTO_STORAGE_LOCATION> | where label is jaipur trip and where selected is true and where photo storage is my picture gallery |
| [operation:save, savedAs:<SAVE_LOCATION>, speech- act:request, theme:[type:photo, downloaded:true]] | request save operation save as <SAVE_LOCATION> on photo and where downloaded is true | request save operation save as wallpaper on photo and where downloaded is true |
| [operation:edit, editingMethod:<EDIT_METHOD>, speech-act:request, theme:[type:photo, label: <PHOTO_TAG>, downloaded:true]] | request rotate operation on photo where label is <PHOTO_TAG> and downloaded is true | request rotate operation on photo where label is flowers and downloaded is true |
| [operation:hide, speech-act:request, theme:[type:photo, selected:false]] | request hide operation on photos where selected is false | request hide operation on photos where selected is false |
| [operation:delete, speech-act:request, theme:[type:photo, label:<PHOTO_TAG>, creationLocation:<LOCATION>]] | request delete operation on photos where label is <PHOTO_TAG> and where creation location is <LOCATION> | request delete operation on photos where label is night scene and where creation location is space needle |

Obtaining a Natural Language Utterance of a User Based on a Canonical Statement

In an operation 306, natural language utterance collector and validator 224 (hereinafter "NLUCV 224 for convenience") may obtain natural language utterances from users for each canonical statement. For example, NLUCV 224 may direct various users to provide a natural language utterance that, in their own words, conveys the canonical statement. In this manner, various user utterances for each canonical statement (and therefore operator) may be collected. As such, the system may identify how users would make an utterance corresponding to an operator (by uttering, in their own words, a canonical statement). The results may be used to quickly and efficiently generate a semantic parser.

In some instances, NLUCV 224 may generate a crowd task to be performed by crowd users. The crowd task may include instructions for a crowd user to make an utterance conveying a canonical statement. In crowd-sourced implementations, NLUCV 224 may transmit the crowd task to one or more crowd sourcing services 105 and/or may directly provide the crowd task to various crowd users. Examples of crowd-sourced tasks are fully described in U.S. patent application Ser. No. 15/257,084, entitled "SYSTEM AND METHOD OF ANNOTATING UTTERANCES BASED ON TAGS ASSIGNED BY UNMANAGED CROWDS," filed on Sep. 6, 2016, the contents of which is hereby incorporated by reference herein in its entirety.

Responses may be collected from the crowd users and associated with corresponding canonical statements, which are each themselves associated with a corresponding operator. For example, a natural language utterance of a crowd user may be stored in association with (e.g., using a database link) a canonical statement in a database 112. Likewise, the canonical statement may be stored in association with (e.g., using a database link) a corresponding operator. In this manner, a given automatically generated operator may be stored in association with multiple user utterances corresponding to the operator, which may be used to generate a semantic parser for natural language processing.

Validating a Natural Language Utterance of a User Based on a Canonical Statement some instances, in an operation 308, NLUCV 224 may validate a natural language utterance, associated with a canonical statement, obtained from a first crowd user by taking a second crowd user to validate the utterance. For instance, NLUCV 224 may generate another crowd task for the second crowd user to validate that the natural language utterance made by the first crowd user actually corresponds to the canonical statement. As such, the second crowd task may include the canonical statement and the natural language utterance (e.g., audio of the utterance and/or text such as a transcription of the utterance) for the second crowd user to validate that the utterance relates to the canonical statement. Examples of crowd validations is described in in U.S. patent application Ser. No. 14/846,935, entitled "SYSTEM AND METHOD FOR VALIDATING NATURAL LANGUAGE CONTENT USING CROWDSOURCED VALIDATION JOBS," filed on Sep. 7, 2015 (which issued as U.S. Pat. No. 9,401,142 on Jul. 26, 2016), the contents of which is hereby incorporated by reference herein in its entirety. The crowd validation job may be provided to and collected from crowd users via one or more crowd sourcing services 105 and/or directly via computer system 110.

In some instances, NLUCV 224 may present each constrained expression and fluent paraphrase to a new crowd worker, and asks them to rate how well the fluent paraphrase captures the meaning of the constrained expression:
Task: Request restaurant near place called "Space Needle"
Response form User: "Find a bar close to the Space Needle."
The expected validation from the second crowd user: Doesn't match In some instances, NLUCV 224 may use a more complex validation process which collects more information from the validators (than in the previous example). For example, NLUCV 224 may ask the validators to identify the elements of the constrained expression that don't match the fluent paraphrase (in this example, "restaurant" does not match fluent paraphrase).

NLUCV 224 may add elements to the constrained expression that are known to be not in the fluent paraphrase; if the validators do not find these elements NLUCV 224 may determine that the validator is unreliable. For example:
Task: Request French restaurant near place called "Space Needle"
Response: Find a restaurant close to the Space Needle.
Expected response: "French" doesn't match the fluent paraphrase, but if the validator misses this and indicates a match, then NLUCV 224 deem the validator to be unreliable (and store such rating in association with the crowd user in a database, such as a database 112).

As used herein, crowd jobs are deployed or otherwise provided to users via a crowd sourcing service 105 by causing information that specifies the crowd job to be transmitted to the crowd sourcing service, such as via a network 107. Likewise, responses (also referred to herein as "annotations") to crowd jobs may be received from crowd sourcing service 105 in the form of information transmitted over the network which conveys the responses.

Multi-Lingual Support

In an implementation, the system may be used to generate semantic parsers in multiple languages in various ways. For example, canonical statement generator 222 may support multiple languages by, for each operator, generating a canonical statement in multiple languages. The foregoing is efficient because canonical statements are relatively terse (compared to conversational language) and are therefore more easily and accurately translated to multiple languages. In this implementation, each canonical statement may be translated into various languages, and canonical statements may be provided to crowd users (e.g., by NLUCV 224) that speak a corresponding language.

In some instances, NLUCV 224 may support multiple languages by asking a given crowd user to generate a natural language utterance for a canonical statement in more than one language (or in their native language to the extent they can understand the canonical statement). In this manner, different language responses may be collected from crowd users.

Whichever one or more methods are used to support multiple languages, validations may be performed for each of the languages (e.g., through validation crowd jobs in an appropriate language).

The one or more processors 212 illustrated in FIG. 2 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in FIG. 2 as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 107, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein.

What is claimed is:

1. A system of generating a semantic parser for natural language processing, comprising:
one or more physical processors programmed to:
generate an operator that represents a computer-executable instruction that resolves a request;
generate at least one canonical statement of the operator for presentation to a human user, wherein the at least one canonical statement expresses the request in a first manner, and wherein the at least one canonical statement is generated after generating the operator;

generate a task, after the operator has been generated and to be performed by the human user, to make an utterance that conveys the canonical statement in a second manner different than the first manner;

receive the utterance;

associate the utterance with the operator; and generate the semantic parser based on the association of the utterance with the operator.

2. The system of claim 1, wherein the operator is a de-lexicalized operator.

3. The system of claim 2, wherein the de-lexicalized operator replaces an entity with a named entity type.

4. The system of claim 2, wherein the de-lexicalized operator utilizes an attribute-value pair format comprising an attribute and a corresponding value of the attribute.

5. The system of claim 4, wherein the attribute-value format includes a head attribute.

6. The system of claim 4, wherein the at least one canonical statement is generated by converting the attribute-value pair of an operator using a rule-based process.

7. The system of claim 6, wherein the converting of the attribute-value pair comprises mapping the attribute-value pair to a text string.

8. The system of claim 1, wherein at least two different canonical statements in two different languages are generated for the operator.

9. The system of claim 8, wherein the operator is a de-lexicalized operator.

10. The system of claim 9, wherein the de-lexicalized operator utilizes an attribute-value pair format comprising an attribute and a corresponding value of the attribute.

11. A computer-implemented method of generating a semantic parser for natural language processing, comprising:

generating an operator that represents a computer-executable instruction that resolves a request;

generating at least one canonical statement of the operator for presentation to a human user, wherein the at least one canonical statement expresses the request in a first manner, and wherein the at least one canonical statement is generated after generating the operator;

generating a task, after the operator has been generated and to be performed by the human user, to make an utterance that conveys the canonical statement in a second manner different than the first manner;

receiving the utterance;

associating the utterance with the operator; and generating the semantic parser based on the association of the utterance with the operator.

12. The method of claim 11, wherein the operator is a de-lexicalized operator.

13. The method of claim 12, wherein the de-lexicalized operator replaces an entity with a named entity type.

14. The method of claim 12, wherein the de-lexicalized operator utilizes an attribute-value pair format comprising an attribute and a corresponding value of the attribute.

15. The method of claim 14, wherein the attribute-value format includes a head attribute.

16. The method of claim 14, wherein the at least one canonical statement is generated by converting the attribute-value pair of an operator using a rule-based process.

17. The method of claim 16, wherein the converting of the attribute-value pair comprises mapping the attribute-value pair to a text string.

18. The method of claim 11, wherein at least two different canonical statements in two different languages are generated for the operator.

19. The method of claim 18, wherein the operator is a de-lexicalized operator.

20. The method of claim 19, wherein the de-lexicalized operator utilizes an attribute-value pair format comprising an attribute and a corresponding value of the attribute.

* * * * *